United States Patent [19]

Yuguchi et al.

[11] Patent Number: 4,483,014
[45] Date of Patent: Nov. 13, 1984

[54] MEDICAL X-RAY INSPECTION APPARATUS

[75] Inventors: Naoki Yuguchi, Yokohama; Keiichi Kawasaki, Tokyo, both of Japan

[73] Assignee: Canon Kabushiki Kaisha, Tokyo, Japan

[21] Appl. No.: 579,029

[22] Filed: Feb. 10, 1984

Related U.S. Application Data

[63] Continuation of Ser. No. 335,757, Dec. 30, 1981, abandoned.

[30] Foreign Application Priority Data

Jan. 13, 1981 [JP] Japan ................................ 56-3591
Sep. 18, 1981 [JP] Japan ............................ 56-148609

[51] Int. Cl.³ .................... B65H 29/00; B65H 29/34; C03B 19/10
[52] U.S. Cl. .................................. 378/173; 271/189; 271/192
[58] Field of Search ............... 378/173; 271/189, 190, 271/192

[56] References Cited

U.S. PATENT DOCUMENTS

| | | | |
|---|---|---|---|
| 2,320,094 | 5/1943 | Nash | 271/192 |
| 3,126,657 | 3/1964 | Hajos | 271/192 |
| 3,306,609 | 2/1967 | Beuck | 271/192 |
| 4,206,989 | 6/1980 | Hahn et al. | 378/173 |
| 4,207,788 | 6/1980 | Regele | 271/192 |

FOREIGN PATENT DOCUMENTS 2037712 7/1980 United Kingdom ............... 271/189

Primary Examiner—Alfred E. Smith
Assistant Examiner—T. N. Grigsby
Attorney, Agent, or Firm—Fitzpatrick, Cella, Harper & Scinto

[57] ABSTRACT

A medical X-ray inspection apparatus is provided with an exposure machine in which sheet films are successively conveyed to an exposure stage and exposed to X-rays passed through an object to be photographed, a receive magazine provided with a containing space for temporally containing the exposed sheet films therein and a containing chamber for containing therein the sheet films in a piled relationship, the receive magazine being removably mountable to the exposure machine, a member in the receive magazine for holding the forward end of each sheet film, a support member for supporting the opposite side edges of each sheet film, the support member being cyclically movable away from the movement path of the sheet films for shifting the sheet films from the containing space of the receive magazine to the containing chamber, and another support member for supporting the rearward end of the sheet film to separate a newly contained sheet film from the sheet films piled in the containing chamber, said another support member being movable away from the movement path of the sheet films.

23 Claims, 39 Drawing Figures

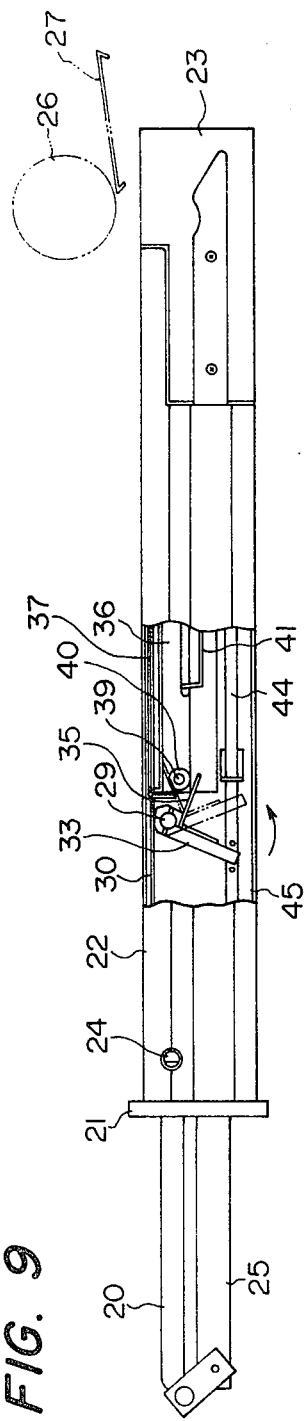
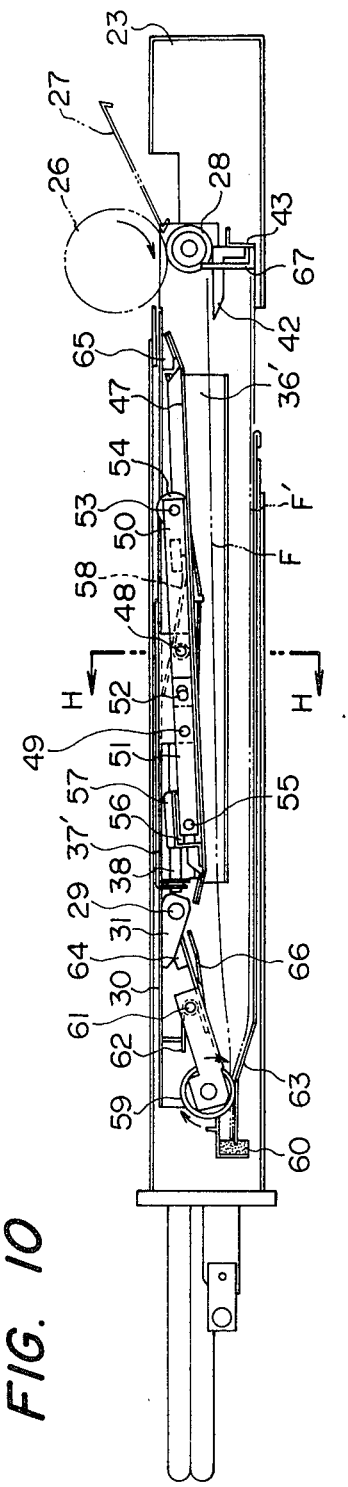
FIG. 9
FIG. 10
FIG. 11

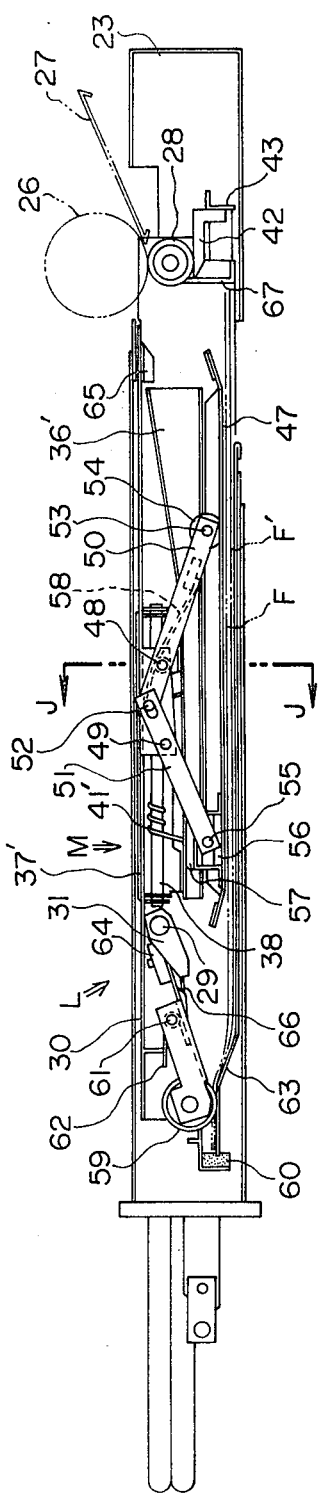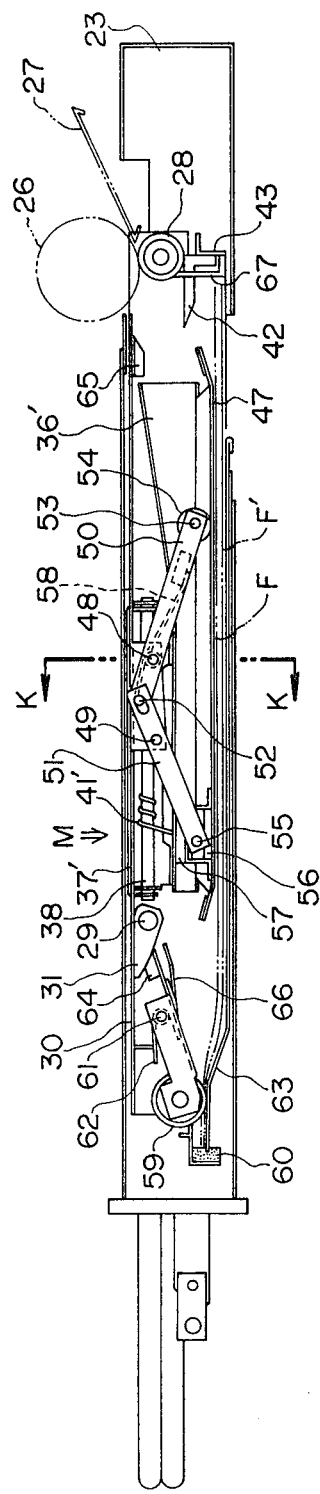

MEDICAL X-RAY INSPECTION APPARATUS

This is a continuation of application Ser. No. 335,757 filed Dec. 30, 1981, now abandoned.

BACKGROUND OF THE INVENTION

1. Field of the Invention

This invention relates to a medical X-ray inspection apparatus, and particularly to an apparatus for smoothly piling and containing therein sheet-like record carriers on which information has been recorded.

2. Description of the Prior Art

The form of use of an X-ray exposure apparatus according to the prior art will first be explained and the problems peculiar to the prior art with respect to the form of use newly required will also be described. FIGS. 1 to 5 of the accompanying drawings show the apparatus according to the prior art. In FIG. 1, reference numeral 1 designates a sheet film exposure apparatus body, reference numeral 2 denotes a supply magazine for containing unphotographed sheet films 3 therein, reference numeral 4 designates the film takeout port of the supply magazine, reference numeral 5 denotes a receive magazine for containing photographed sheet films 6 therein, reference numeral 7 designates the film receiving port of the receive magazine, reference numerals 8–12 denote rollers for feeding sheet films, and reference numerals 13 and 14 designate guide plates for guiding sheet films. Reference characters 15a and 15b denote intensifying screens constituting an exposure portion. The intensifying screens 15a and 15b together form an exposure stage. In FIG. 1, the unphotographed sheet films 3 contained in the supply magazine 2 are fed one by one through the film take-out port 4 by a mechanism, not shown, and are nipped between the rollers 8 and 9 rotated in the direction of arrow, whereby they are conveyed to between the intensifying screens 15a and 15b. By a mechanism, not shown, the intensifying screens 15a and 15b bring a sheet film 3' into intimate contact therewith and photography is effected there. After completion of the photography, the intensifying screens 15a and 15b release the sheet film 3' out of the intimate contact and the photographed sheet film is conveyed through the film receiving port 7 into the receive magazine 5 by rotation of the rollers 10, 11 and 12.

As the photographing method using the sheet film exposure apparatus shown in FIG. 1, there is a case where, as shown in FIGS. 2 and 3, photography is effected with a photographing surface fixed horizontally or vertically with respect to the floor surface, or a case where, as shown in FIGS. 4 and 5, the sheet film exposure apparatus is mounted on an arm 18 rotatable about a point A and photography is effected while the sheet film exposure apparatus is being rotatively moved to the range of 90° which is the dots-and-dash line position in FIG. 5. Here, reference numeral 17 designates an X-ray tube ball, and M denotes an examinee, and FIG. 5 shows a side view of the FIG. 4 arrangement. In such a conventional photographing method, the receiving port 7 of the receive magazine never faces the floor surface side. Accordingly, there could be no condition in which new photographed sheet 6 had to be contained against the gravity of the photographed sheet films 6 already contained in the receive magazine 5.

In the conventional photographing method as described above, there is the following requirement imposed upon the photographed film containing mechanism of the sheet film exposure apparatus. That is, the requirement is that the entry of a photographed sheet film 6 newly coming into the receive magazine 5 be not hindered by curling of the photographed sheet films 6 already contained in the receive magazine 5 and falling of the already contained photographed sheet films 6 caused when the receive magazine 5 is disposed vertically relative to the floor surface.

Conventional photographed film containing mechanisms which meet such requirement are disclosed in Japanese Utility Model Publications Nos. 10551/1972 and 22380/1979.

Recently, with the advance of the photographing technique and in pursuit of images of higher diagnostic power, studies have been continued on an apparatus as shown in FIGS. 6 and 7 of the accompanying drawings wherein a sheet film exposure apparatus is mounted on an arm 19 and slidden in the direction of arrow indicated in FIG. 6 and also rotated about the point B of FIG. 7, thereby enabling photography to be accomplished at any angle. Here, reference numeral 17 designates an X-ray tube ball, and M denotes an examinee, and FIG. 7 shows a side view of the FIG. 6 arrangement. In the case of this photographing method, considering the conditions in which the receive magazine 5 is placed, as shown in FIG. 8 of the accompanying drawings, there are the horizontal position D to the vertical position E in which the film receiving port 7 faces the ceiling surface and further, the upside down position G in which the film receiving port 7 faces the floor surface. Particularly, in the upside down position G, the already contained photographed sheet films 6 fall downwardly from gravity and therefore, the movement path of the photographed sheet film 6 to be contained next is hindered. Accordingly, the photographed film containing mechanisms according to the prior art cannot cope with this problem and suffers from a difficulty that the photographed sheet film 6 cannot fully enter the receive magazine 5.

SUMMARY OF THE INVENTION

It is a primary object of the present invention to enable sheet-like record carriers on which exposure has been completed to be smoothly contained into a container.

It is another object of the present invention to ensure sheet films to be contained irrespective of the attitude of the X-ray exposure apparatus.

It is still another object of the present invention to prevent an earlier contained sheet film from hindering entry of a later conveyed sheet film.

It is yet still another object of the present invention to increase the speed at which sheet films are shifted from a containing space in the container to a containing chamber.

It is a further object of the present invention to prevent sheet films conveyed at a high speed from rebounding in their original direction after having struck against the wall surface in the container.

The present invention should not be restricted to an apparatus which is turned upside down during the use thereof.

The invention will become fully apparent from the following detailed description thereof taken in conjunction with the accompanying drawings.

BRIEF DESCRIPTION OF THE DRAWINGS

FIG. 9 is a side view showing an embodiment of the present invention.

FIGS. 10 to 13 are longitudinal cross-sectional views thereof.

FIG. 26 is a plan view thereof.

DESCRIPTION OF THE PREFERRED EMBODIMENTS

Figure 14:
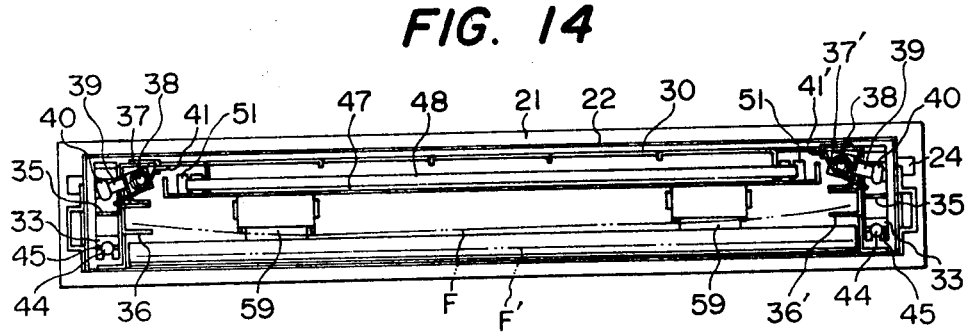
FIGS. 14 to 17 are transverse cross-sectional views thereof.
Figure 15:
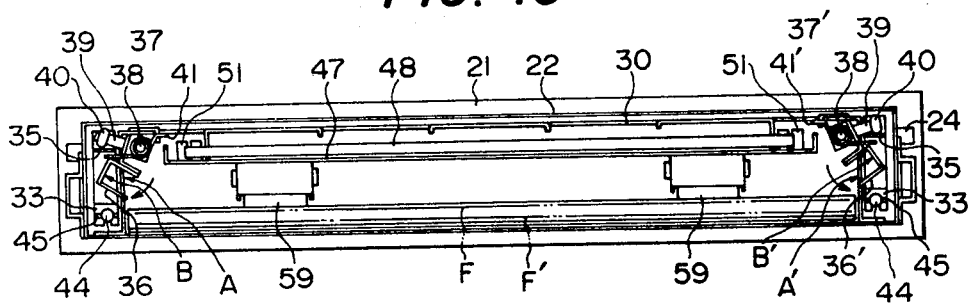

An embodiment of the present invention will hereinafter be described with reference to FIGS. 9 to 18, and the epitom thereof will first be described. FIG. 9 shows the sideward form of the receive magazine according to an embodiment of the present invention with a part thereof broken away. FIGS. 10 to 13 show the longitudinal cross-section of the receive magazine after the magazine lid 23 has been opened The cross-sections H—H, I—I, J—J and K—K in FIGS. 10 to 13 are depicted in FIGS. 14 to 15, and an upward view and an upward view with a cover removed are shown in the upper half and the lower half, respectively, of FIG. 18. This receive magazine corresponds to the magazine 5 of FIG. 1.

In FIG. 9, reference numeral 36 designates a side holding member which, as shown in the cross-sectional view of FIG. 14, forms a U-shape by two upper and lower elongate plates and side plates and which cooperates with another side holding member 36' disposed at an opposed position to form a containing space for temporally containing a sheet film F. The lower ends of these side holding members 36 and 36' have the function of supporting the side edges of an already contained sheet film F' and spacing them apart from the containing space when the receive magazine has been turned upside down. Accordingly, it is desirable to provide a length exceeding one-half of the length of an ordinary sheet film with the flexure of the sheet film taken into account.

Reference numeral 42 on the rightward side of FIG. 10 designates a pawl having the function of supporting the trailing end of the already contained sheet film F' (which means the rearward end edge of the sheet film when fed) and spacing it apart from the containing space when the receive magazine has been turned upside down. When the sheet film F is shifted into the containing chamber, the side holding members 36 and 36' rock as shown in FIG. 15 and the pawl 42 retracts from the shift path as shown in FIG. 11 and further, by taking into account a case where the sheet film does not shift from gravity, a push-in plate 47 is lowered along the shift path from the containing space to a containing chamber (FIGS. 10 to 12).

On the other hand, there is an inconvenience that a sheet film fed at a high speed from the X-ray exposure apparatus body strikes against the inner wall of the receive magazine and rebounds thereby to stagnate the containment of the sheet film. In the present embodiment, the rebound of the sheet film is prevented by providing an impact energy absorbing member 60 (leftward in FIG. 10) in the inner wall and in addition, a roller 59 provided with a surface of high friction coefficient, the roller 59 having the function of supporting the leading end of the sheet film (which means the forward end edge of the sheet film when fed) when the receive magazine has been turned upside down.

The construction will hereinafter be described in greater detail.

Turning back to FIG. 9, reference numeral 20 designates a handle, reference numeral 21 denotes a flange, reference numeral 22 designates a magazine outer box, and reference numeral 23 denotes a magazine lid. When the present receive magazine is loaded into the sheet film exposure apparatus body (not shown), it is fixed to the body side by a lock pawl 24. Designated by 25 is a lever for opening the magazine lid 23. When the magazine lid 23 is opened after the receive magazine has been fixed to the exposure apparatus body, a feed roller 26 and a guide plate 27 come into the receive magazine from the exposure apparatus body side with the aid of an unshown mechanism, as shown in FIG. 10, and the feed roller 26 bears against a roller 28 within the receive magazine. The feed roller 26 is normally urged against the roller 28 by the biasing force of a spring, not shown, and has a sufficient drive force to feed a photographed sheet film.

Designated by 29 is a shaft rotatably supported on a frame 30. A block 31 rockable when the drive force (arrow L) shown in FIG. 11 is transmitted thereto from the apparatus body is fixed to the shaft 29. A lever 33 is fixed to a portion of the shaft 29 which is outboard of the frame 30, and the lever 33, with a plate spring 35 fixed thereto, is pivotable about the shaft 29 in the direction of arrow indicated in FIG. 9.

The side holding members 36 and 36', as previously described, serve as a guide when photographed sheet film F is contained into the receive magazine, and also serves to prevent a previously contained photographed sheet film F' from falling down from gravity when the sheet film exposure apparatus body is used in its upside down position wherein the receiving port of the receive magazine faces the floor surface, and they are pivotably mounted on a shaft 38 pivotally supported by sheet metals 37 and 37' fixed to the frame 30. A shaft 39 is fixed to the side holding members 36 and 36', and a roller 40 is rotatably mounted on one end of this shaft 39. When the drive force (arrow L) shown in FIG. 11 is imparted from the apparatus body, the block 33 shown in FIG. 9 rocks in the direction of arrow, whereby the plate spring 35 raises the roller 40 and the side holding members 36 and 36' are rotated about the shaft 38 in the direction of arrow indicated in FIG. 15. The side holding members 36 and 36' are normally biased by torsion springs 41 and 41' in a direction opposite to the direction of arrow indicated in FIG. 15, and when a photographed sheet film is contained into the receive magazine, the surfaces A and A' of the frame 30 and the surfaces B and B' of the side holding members 36 and 36' become flush with each other, thus bringing about a condition in which a photographed sheet film may be readily contained.

As previously described, the pawl 42 also serves to prevent or block a previously contained photographed sheet film F' from falling down from gravity when the sheet film exposure apparatus body is used in its upside down position, and it is fixed to a sliding metal sheet 43. This sliding metal sheet 43 is supported by the frame 30 and fixed to a freely slidable shaft 44.

Figure 18:
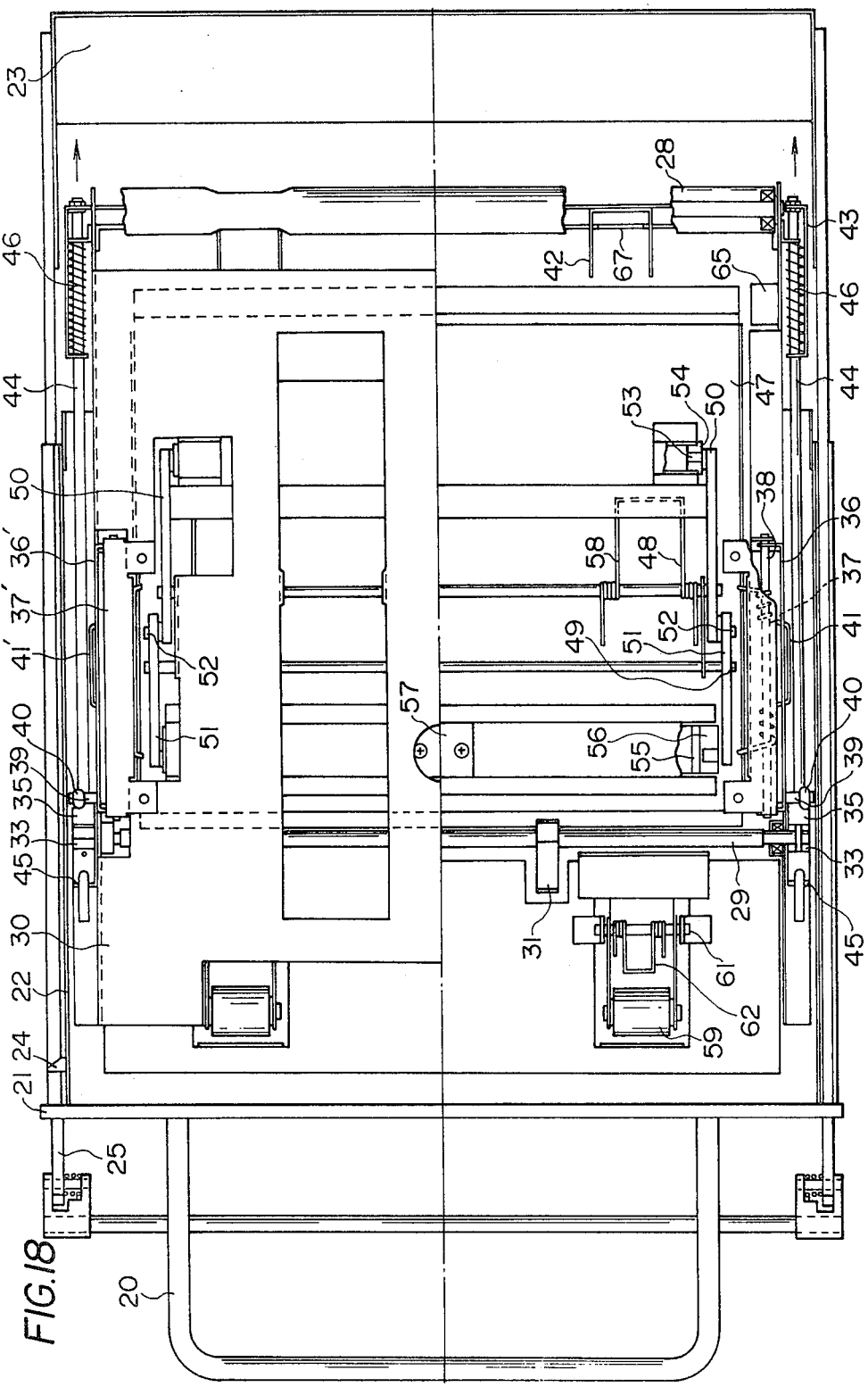
FIG. 18 is a plan view thereof.

By the block 33 shown in FIG. 9 rocking in the direction of arrow, the sliding shaft 44, the sliding metal sheet 43 and the pawl 42 together slide in the direction of arrow indicated in FIG. 18 with a pin 45 fixed to the sliding shaft 44 as a guide. The sliding shaft 44 is normally biased by a compression spring 46 in a direction opposite to the direction of arrow indicated in FIG. 9.

Designated by 47 is a push-in plate for raising a previously contained photographed sheet film F' upwardly of the side holding members 36, 36' and the pawl 42 to prevent the sheet film from falling down from gravity when the sheet film exposure apparatus body is used in its upside down position. The push-in plate 47 is adapted to move downwardly in FIG. 12 when the drive force (arrow M) shown in FIG. 12 is imparted thereto from the apparatus body. Denoted by 48 and 49 are shafts supported by the frame 30. Levers 50 and 51 are pivotally supported on the portions of these shafts which are outboard of the frame 30. A shaft 52 fixed to one side of the lever 50 fits in a slot formed in the lever 51, and a shaft 53 fixed to the other side of the lever 50 is rotatably fitted to a bearing 54 fixed to the push-in plate 47. A shaft 55 is fixed to that side of the lever 51 which is opposite to the slot therein, and this shaft 55 is slidably fitted to a slide bearing 56 fixed to the push-in plate 47. Designated by 57 is a resin plate fixed to the push-in plate 47 and, when the drive force (arrow M) shown in FIG. 12 is imparted to the resin plate 57 from the apparatus body, the shaft 55 slides in the slide bearing 56 while being depressed and the lever 51 rotates about the shaft 49 while, at the same time, the lever 50 also rotates about the shaft 48, whereby the push-in plate 47 moves downwardly in FIG. 12. The push-in plate 47 is normally biased upwardly as viewed in FIG. 10 by a torsion spring 58 so as not to interfere with the movement of a photographed sheet film when contained into the receive magazine.

Reference numeral 59 designates a one-way rotatable roller which is rotatable in the direction of arrow indicated in FIG. 10, namely, the direction in which photographed sheet films are contained, but not rotatable in a direction opposite to the direction of arrow to prevent rebound of sheet film caused when it strikes against a cushion member 60. The surface of the roller 59 is formed of a material such as rubber having a great friction force with respect to the film surface. This one-way rotatable roller is rockable about a shaft 61 and is normally biased into contact a film-receiving plate 63 by a torsion spring 62. Moreover, the one-way rotatable roller 59 is provided with a balance weight 64 for balancing the moment with respect to the shaft 61, whereby even in the upside down position, the same pressure force as that during the horizontal position may be provided. Reference numerals 65 (rightward side of FIG. 10) and 66 respectively designate a guide top and a guide plate by which photographed sheet film may be contained into the receive magazine, and reference numeral 67 denotes a film stopper fixed to the frame 30 for preventing a contained photographed sheet film F' from jumping out of the receive magazine.

The operational sequence of the photographed film containing mechanism of the present invention constructed as described above will now be described by reference to FIGS. 9 to 18.

FIG. 10 shows a condition in which the receive magazine has been mounted to the sheet film exposure apparatus body with the magazine lid 23 opened and, with the aid of a mechanism, not shown, the film feeding roller 26 and guide plate 27 have come into the receive magazine with the feeding roller 26 bearing against the roller 28 in the receive magazine and a new photographed sheet film F has further been contained. The both sides of the end of the photographed sheet film F on the direction of movement thereof come in along the U-shaped portion of the side holding members 36, 36' in FIG. 14 and stop with the leading end of the film sandwiched between the one-way rotatable roller 59 and a film receiving plate 63. F' denotes a photographed sheet film contained earlier than F.

FIGS. 11 and 15 show a condition in which the block 31 has been operated by the drive force (arrow L) from the exposure apparatus body to liberate the side holding members 36, 36' and the pawl 42. When the block 31 is operated by the drive force from the apparatus body, the lever 33 in FIG. 9 rotates in the direction of arrow and the roller 40 is raised upwardly by the plate spring 35 fixed to the lever 33, and the side holding members 36 and 36' rotate about the shaft 38 in the direction of arrow in FIG. 15, so that the photographed sheet film F becomes liberated from the U-shaped portion of the side holding members 36, 36'. Simultaneously therewith, the sliding shaft 44 of FIG. 9 is slidden by rotation of the lever 33 and the pawl 42 can also be caused to escape out of the film stopper 67 as shown in FIG. 11.

Figure 16:
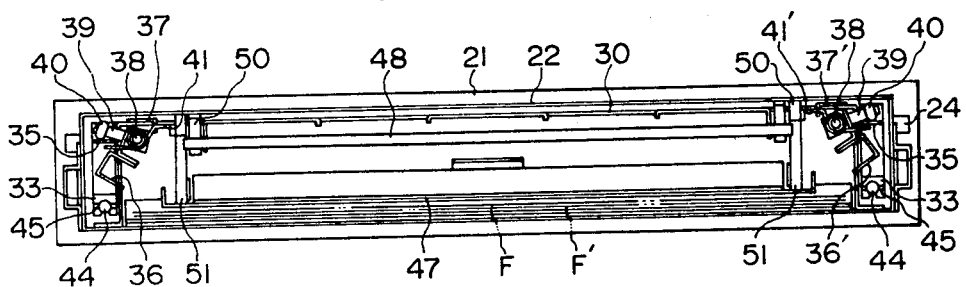

FIGS. 12 and 16 show a condition advanced from the condition of FIG. 11 and in which the push-in plate 47 has been operated by the drive force (arrow M) from the exposure apparatus body to push the contained photographed sheet film F into below the side holding members 36, 36' and the pawl 42. The term "below" herein mentioned is the positional relation on the drawing. When the drive force from the apparatus body is imparted to the resin plate 57 fixed to the push-in plate 47, the push-in plate 47 is depressed downwardly while, at the same time, the levers 50 and 51 are rotated about the shafts 48 and 49, respectively, whereby the push-in plate 47 is moved downwardly. By the push-in plate 47 being fully depressed, the contained photographed sheet film F is pushed in downwardly from the side holding members 36, 36' and the pawl 42, as shown in FIGS. 12 and 16.

Figure 17:
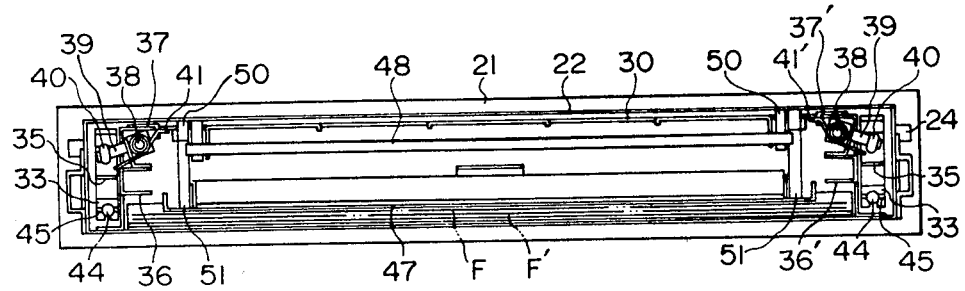

FIGS. 13 and 17 show a condition further advanced from the condition of FIG. 12 and in which the drive force (arrow L) from the exposure apparatus body has been released with the side holding members 36, 36' and the pawl 42 returned to their positions of FIG. 10 and the contained photographed sheet film F has been received below the side holding members 36, 36' and the pawl 42. When the condition is further advanced from this condition and the drive force (arrow M) from the apparatus body is released, the push-in plate 47 also returns to its position of FIG. 10 to enable containment of a new photographed sheet film F.

In order that containment of photographed film may be possible in a case where the sheet film exposure apparatus body assumes various attitudes, containment of the film may be possible with respect also to the receive magazine which is in the respective positional relation shown in FIGS. 19–23. It is to be understood that the underside of the drawings is the floor surface side.

The possibility of containment of new photographed film in the condition of FIG. 10 will now be described with respect to the respective cases of FIGS. 19–23.

Figure 19:
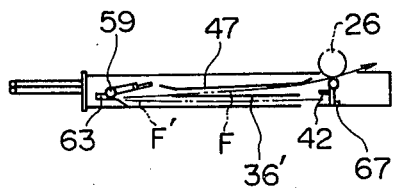
FIGS. 19 to 23 show the attitudes assumed by the receive magazine.

In the case of FIG. 19, the direction of gravity exerted on the already contained film F' is the direction in which a space is created in the movement path of a film F to be newly contained and therefore, the film may be smoothly contained.

Figure 20:
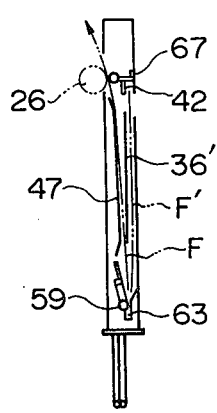
Figure 21:
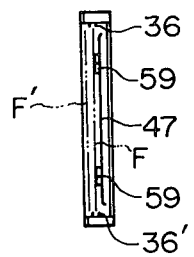

In the cases of FIGS. 20 and 21, if the already contained film F' falls or is curled, the movement path of the film F to be newly contained will be hindered. However, the side holding members 36, 36', the pawl 42 and the one-way rotatable roller 59 prevent falling or curling of the film, so that no unsatisfactory containment occurs.

Figure 22:
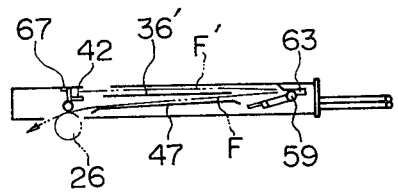

In the case of FIG. 22, the already contained film F' falls in the direction which hinders the movement path of the film F to be newly contained. However, the four peripheral sides of the already contained film F' are supported by the actions of the side holding members 36, 36', the pawl 42 and the one-way rotatable roller 59, whereby the space for the movement path of the film F to be newly contained is secured to ensure smooth containment of the film.

Figure 23:
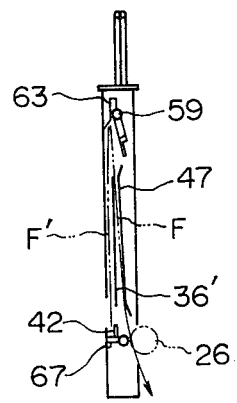

In the case of FIG. 23, in addition to the problems peculiar to the cases of FIGS. 20 and 21, there is a problem that a film once contained falls onto the film feeding roller 26 side conversely to the case of containment to thereby close the film receiving port. However, according to the present invention, the one-way rotatable roller 59 having a great friction force acts on the newly contained film F to prevent backward movement thereof, and the films F' already contained in the magazine, when the number thereof is increased to some extent, are increased in their weight and fall onto the feeding roller 26 side except the one film which is in direct contact with the one-way rotatable roller, but they are securely supported by the actions of the pawl 42 and the film stopper 67 and thus, do not interfere with the film receiving port. Accordingly, again in the case of FIG. 23, the films can be contained smoothly.

If an attempt is made to increase only the pressure force of the one-way rotatable roller 59 to prevent the already contained film F' from falling onto the feeding roller 26 side, the film F to be newly contained will not move forwardly of the one-way rotatable roller 59 and unsatisfactory containment will occur.

Figure 1:
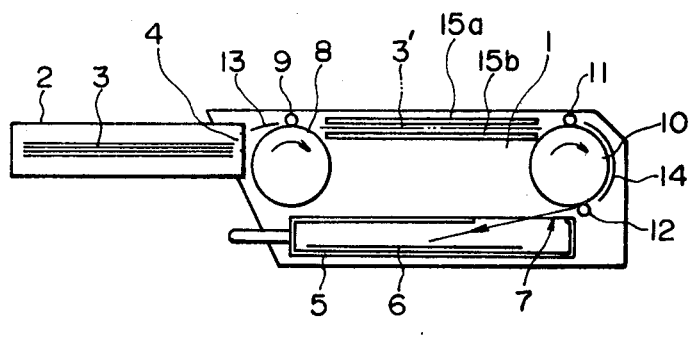
FIG. 1 is a longitudinal cross-sectional view of an X-ray sheet film exposure apparatus.
Figure 2:
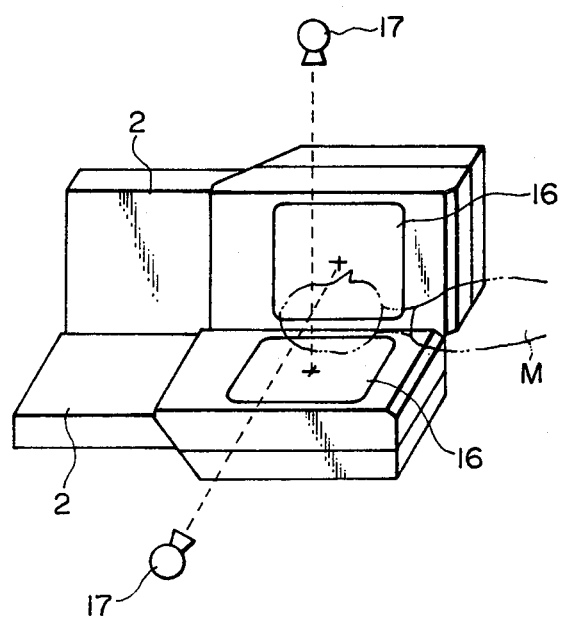
FIGS. 2 and 3 are perspective views illustrating a form of use of the FIG. 1 apparatus.
Figure 3:
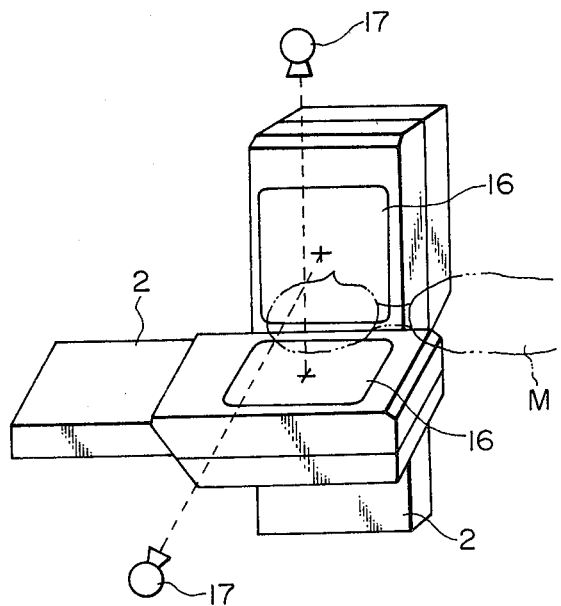
Figure 4:
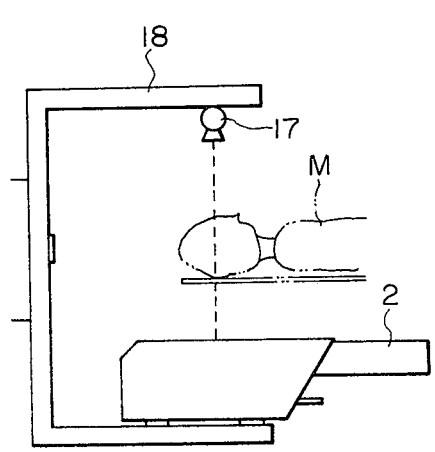
FIG. 4 is a side view of the same apparatus.
Figure 5:
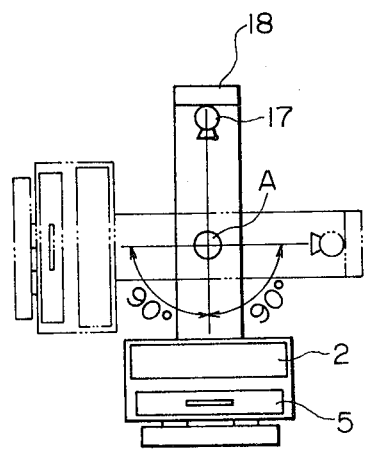
FIG. 5 is a plan view of the same apparatus.
Figure 6:
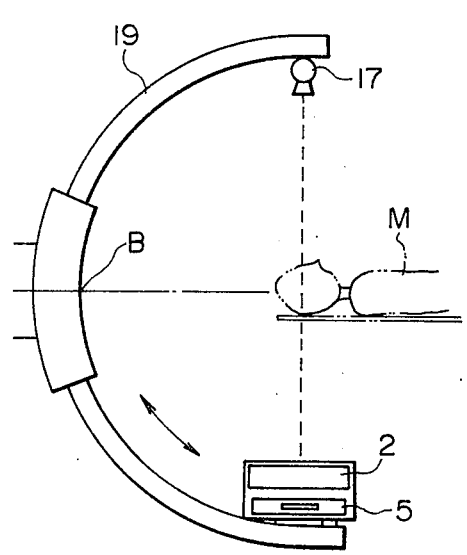
FIG. 6 is a side view illustrating another form of use.
Figure 7:
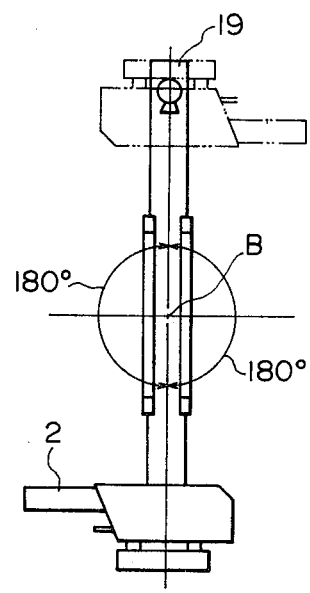
FIGS. 7 and 8 are front views.
Figure 8:
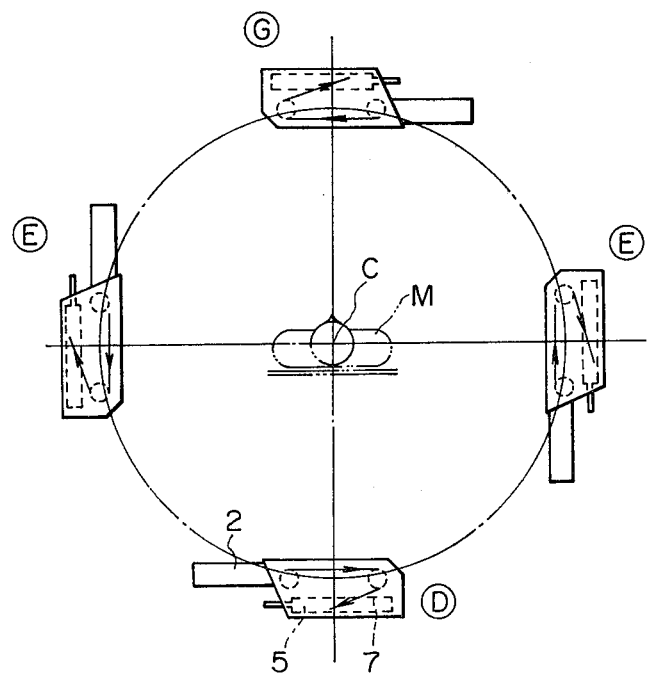
Figure 24:
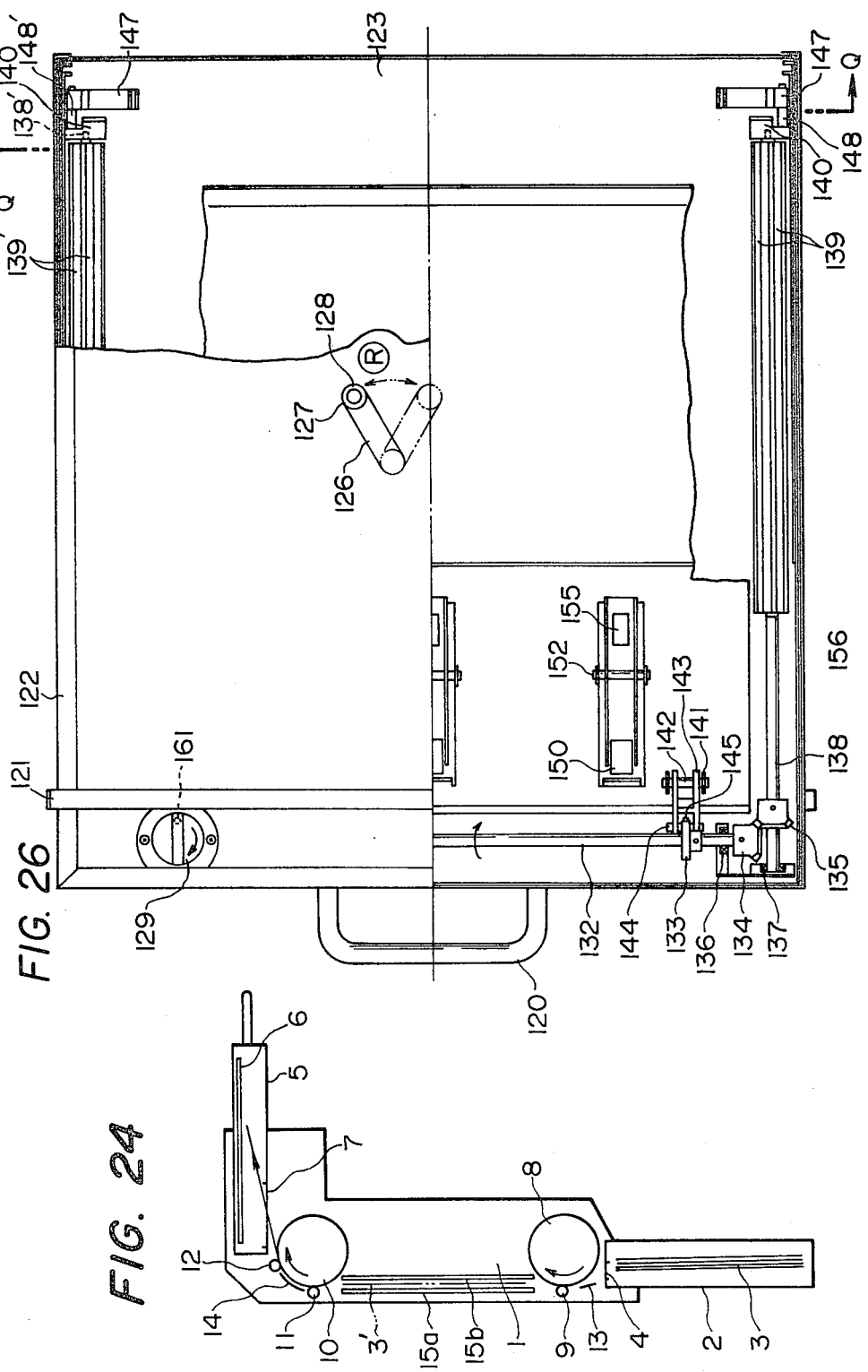
FIG. 24 is a longitudinal cross-sectional view of another X-ray sheet film exposure apparatus.

While a typical example of the sheet film exposure apparatus has been shown in FIG. 1, the arrangement of the supply magazine 2, the exposure unit comprising intensifying screens 15a and 15b, and the receive magazine 5 is not restricted thereto. Another example of the arrangement is shown in FIG. 24, wherein members functionally similar to those of FIG. 1 are given similar reference numerals.

In the present sheet film exposure apparatus, the exposure unit is formed by intensifying screens, whereas the photographed film containing mechanism of the present invention is also usable for a sheet film exposure apparatus of the type which does not use intensifying paper but forms an image on a sheet film by an optical system, for example.

Figure 25:
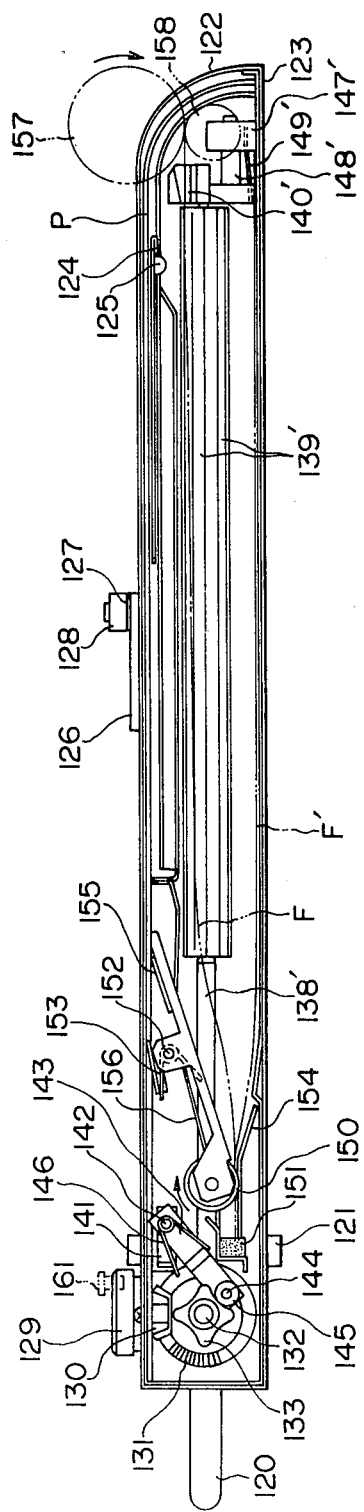
FIG. 25 is a side view showing another specific embodiment.
Figure 27:
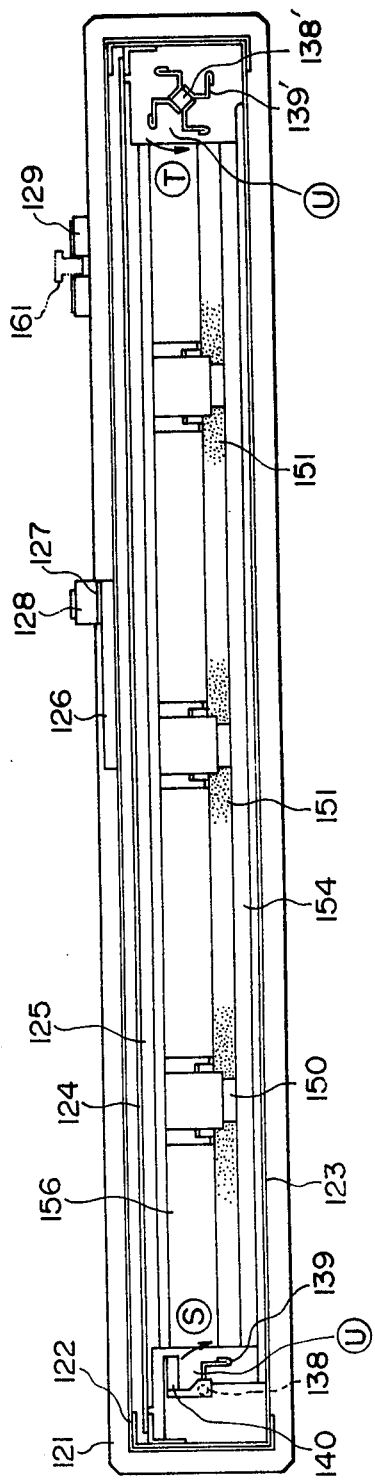
FIGS. 27 and 28 are transverse cross-sectional views thereof.
Figure 28:
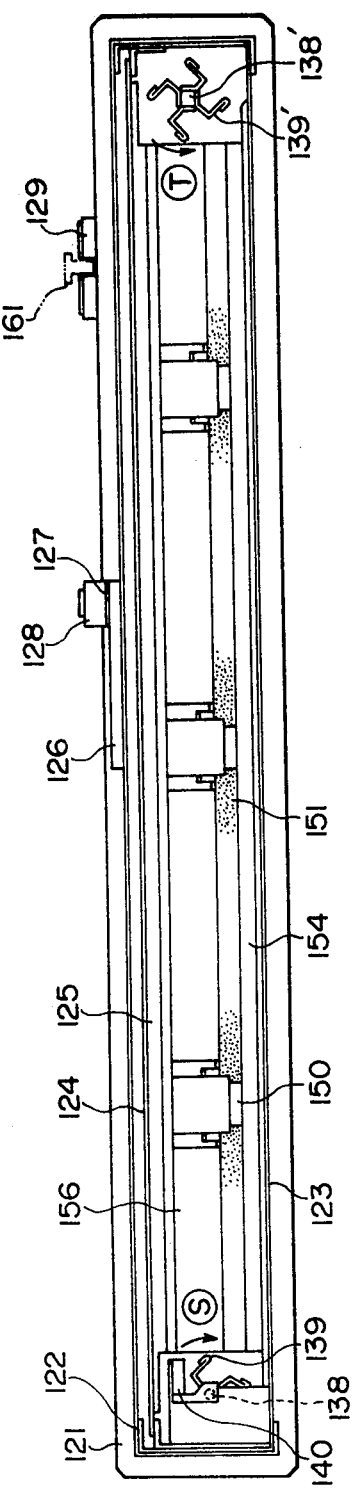
Figure 29:
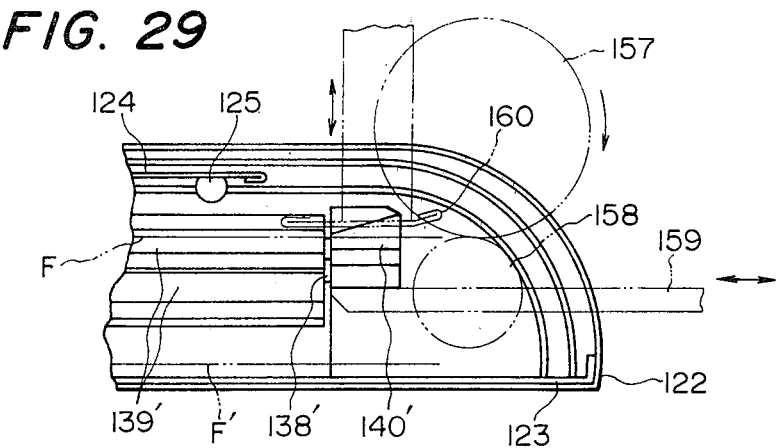
FIGS. 29-31 are longitudinal cross-sectional views of the essential portions thereof.
Figure 30:
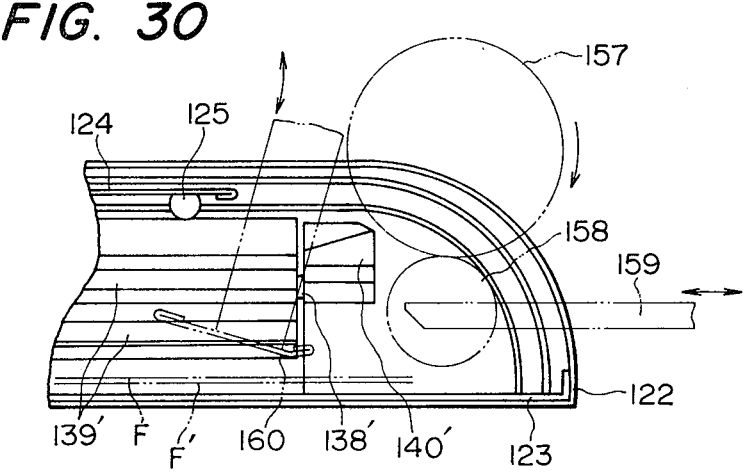
Figure 31:
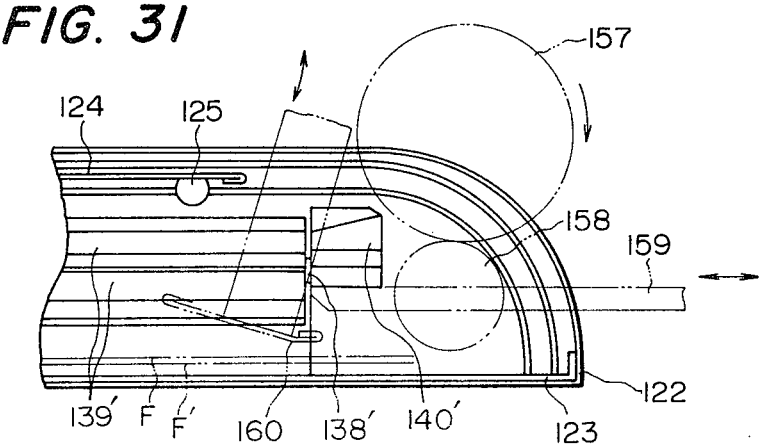
Figure 32:
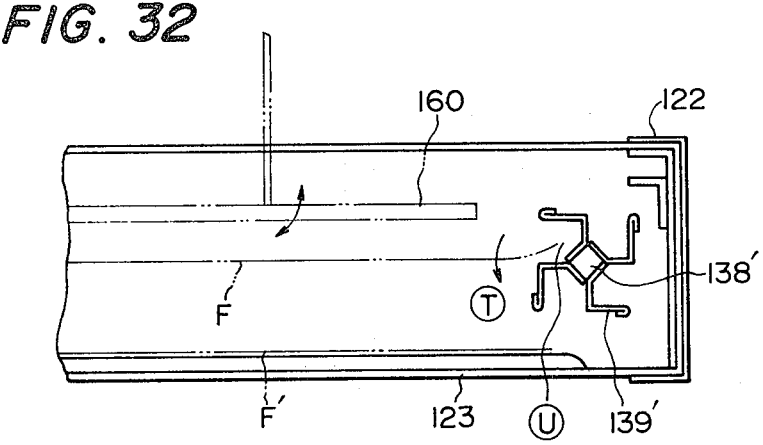
FIGS. 32-34 are transverse cross-sectional views of the essential portions corresponding to FIGS. 29-31.
Figure 33:
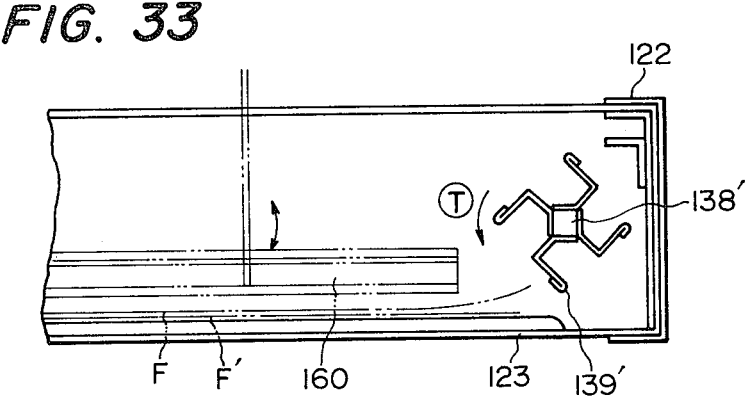
Figure 34:
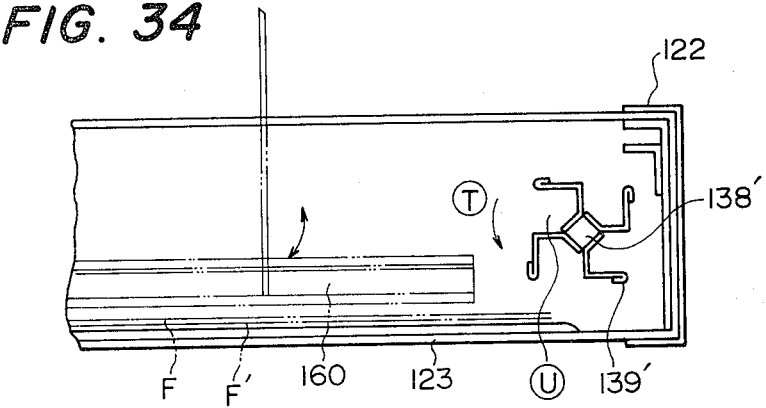

Other specific embodiment will now be described by reference to FIGS. 25 to 34. FIG. 25 shows a sideward cross-sectional view of the receive magazine according to another embodiment, FIG. 26 shows a plan view thereof, and FIGS. 27 and 28 show the Q—Q cross-section in FIG. 26. FIGS. 29 to 31 are sideward cross-sectional views illustrating the details of the operation, and FIGS. 32 to 34 show transverse cross-sections of FIGS. 29 to 31.

This receive magazine corresponds to the receive magazine 5 of FIG. 1.

The epitome of the apparatus will first be described. In FIG. 25, reference numeral 139' desigantes L-shaped film holding vanes, a set of four such vanes being fixed to a film holding vane mounting shaft 138', and as shown in the cross-sectional view of FIG. 27, they cooperate with the next vanes to cyclically provide a U-shaped space U and, with further film holding vanes 139 disposed at opposed positions with a film interposed therebetween, they form a part of a space for temporarily containing sheet film F. The containing space overlies the plane passing through shafts 138 and 138'. The lower ends of these film holding vanes 139 and 139' have the function of supporting the side edges of the already contained sheet film F' and spacing it apart from the containing space when the receive magazine has been turned upside down. Accordingly, it is desirable that the length of the film holding vanes 139, 139' exceed one-half of the length of the ordinary sheet film with the flexure of the sheet film taken into account.

To prevent rebound occurring when sheet film fed from the X-ray exposure apparatus body at a high speed strikes against a cushion member 151, there is provided a one-way rotatable roller 150 having a surface of great friction coefficient, the roller 150 having the function of supporting the leading end of the sheet film (which means the forward end edge of the sheet film when fed) when the receive magazine has been turned upside down.

The epitome of the action imparted from the exposure apparatus body side to the receive magazine will be described by reference to FIG. 29. A film support plate 159 is a member reciprocable to left and right (the direction of arrow) in the figure and has the function of supporting the trailing end of the already contained sheet film F' (which means the rearward end edge of the sheet film when fed) and spacing it apart from the containing space when the receive magazine has been turned upside down, and is adapted to retract so as not to provide an interference when a new photographed sheet film F is shifted from the containing space to a containing chamber. It is desirable that the film support plate 159 support the trailing end of the sheet film F' at least two widthwise locations. A push-in guide plate 160 serves as a guide when the photographed sheet film F is contained into the containing space U formed by the film holding vanes 139', and also is a member for lowering the photographed sheet film F along its movement path in synchronism with the intermitten rotation of the shafts 138 and 138' by taking into account a case where the photographed sheet film F does not shift from the containing space to the containing chamber due to the gravity of the sheet film when the receive magazine has been turned upside down. The containing chamber refers to the portion below the plane passing through the shafts 138 and 138'.

The construction will be described in greater detail.

In FIG. 25, reference numeral 120 designates a handle, reference numeral 121 denotes a flange for intercepting light when the receive magazine has been loaded into the sheet film exposure apparatus body (not shown), reference numeral 122 designates the outer peripheral cover of the receive magazine, and reference numeral 123 denotes a magazine housing. When the receive magazine is loaded into the sheet film exposure apparatus body, it is fixed to the body side by a lock pawl (not shown). Reference numeral 124 designates the light-intercepting flexible slide lid of the receive magazine. When the receive magazine is loaded into the body side, the slide lid 124 slides in an arcuate groove P in response to the loading operation and, as shown in FIG. 25, the slide lid 124 becomes open and film feeding rollers 157 and 158 provided on the body side become ready to enter the receive magazine. This is attributable to the fact that a roller 128 rotatably supported on a shaft 127 secured to a slide lid opening-closing lever 126 traces a slotted cam (not shown) on the body side in association with the receive magazine loading operation, whereby the slide lid opening-closing lever 126 pivots as indicated by arrow R (dots-and-dash line) in FIG. 26 and the slide lid 124 slides in the groove P through an unshown mechanism and opens. FIG. 25 is a sideward cross-sectional view showing the then condition.

Reference numeral 129 designates a receive magazine driving shaft to which is transmitted a clockwise (arrow) rotational force by a driving pin 161 on the exposure apparatus body side, as shown in FIG. 26. Reference numeral 130 in FIG. 25 denotes a bevel gear fixed to the receive magazine driving shaft 129. The bevel gear 130 meshes with a bevel gear 131 fixed to a driving shaft 132 to reduce the speed of rotation of the receive magazine driving shaft 129 to ½ and rotate the driving shaft 132. The direction of rotation of the driving shaft 132 is clockwise (arrow) as indicated in FIG. 25. As shown in FIG. 26, a bevel gear 134 fixed to the driving shaft 132 meshes with a bevel gear 135 fixed to a film holding vane mounting shaft 138 rotatably supported by a bearing 137 and a film guide block 140. Although not shown, bevel gears similar to the bevel gears 134 and 135 are provided at symmetrical positions in the upper half of FIG. 26 and, as shown in FIG. 27, the film holding vane mounting shafts 138 and 138' rotate clockwisely (arrow S) and counter-clockwise (arrow T), respectively.

A set of four film holding vanes 139, 139' is fixed to the film holding vane mounting shafts 138, 138' so as to provide the cross-sectional shape as shown in FIG. 27 and, as previously described, forms a part U of the containing space when the photographed sheet film F is contained into the receive magazine, and also serves to support the side edges of the already contained sheet film F' by the lower ends of the film holding vanes 139 and 139' when the sheet film exposure apparatus body is used in its upside down position wherein the receiving port of the receive magazine faces the floor surface, and to prevent the sheet film from falling downwardly from gravity.

There is such a relation that when, in FIG. 26, the receive magazine driving shaft 129 is clockwisely rotated for ½ of one full revolution, the film holding vane mounting shafts 138 and 138' rotate for ¼ of one full revolution in the directions of arrows S and T, respectively, in FIG. 27.

In FIG. 25, a positioning lever 143 is pivotably supported on a shaft 142 mounted on a metal sheet 141, and a roller 145 is rotatably mounted on the end of the lever 143 by means of a shaft 144. A positioning cam 133 is fixed to the driving shaft 132, and a torsion spring 146 is attached so that the roller 145 normally bears against to cam 133. This mechanism is for rendering the film holding vanes 139 and 139' normally fixed in the condition as shown in FIG. 27 when the rotational force is not transmitted from the exposure apparatus body side to the receive magazine driving shaft 129 and when the receive magazine is withdrawn from the body side. That is, when in this condition, the photographed sheet film F is contained in the space U formed by the film holding vanes 139 and 139'.

Film guide blocks 140 and 140' provide the bearings of the film holding vane mounting shafts 138 and 138' and also serve as the guide when the photographed sheet film F is contained from body side rollers 157, 158 into the space U formed by the film holding vanes 139 and 139'.

Designated by 147 and 147' are film stoppers rotatably supported on shafts 148 and 148' fixed to the film guide blocks 140 and 140'. There is a clearance between the film stoppers 147, 147' and the bottom into which the contained photographed sheet film F' may enter in order that the film may be prevented from jumping out of the receive magazine. When the photographed sheet film is to be removed from the receive magazine in order to develop such film, the film stoppers 147 and 147' may be raised by rotating them about their axes, to thereby enable the sheet film to be removed. However, in order that the film stoppers 147 and 147' may not rotate about the shafts 148 and 148' when the receive magazine has been turned upside down, the film stoppers 147 and 147' are designed to be urged against the receive magazine housing 123 by the click action of plate springs 149 and 149'.

Designated by 150 is a one-way rotatable roller which is rotatable in the direction of arrow of FIG. 25, i.e. the direction in which the photographed sheet film is contained, but not rotatable in a direction opposite to the direction of arrow in order to prevent the rebound caused when the sheet film strikes against a cushion member 151. The surface of the one-way rotatable roller is made of a material having a strong friction force relative to the film surface. This one-way rotatable roller 150 is rockable about a shaft 152 rotatably supported on a guide plate 156 and is normally biased into contact with a film receiving plate 154 by a torsion spring 153. Moreover, it is provided with a balance weight 155 for balancing the moment with respect to the shaft 152, thereby providing the same pressure force as that in the horizontal position even when the receive magazine has been turned upside down.

The operational sequence of the photographed film containing mechanism according to the present invention constructed as described above will now be described by reference to FIGS. 29 to 34.

FIGS. 29 and 32 are a sideward cross-sectional view and a transverse cross-sectional view, respectively, showing a condition in which the receive magazine has been loaded into the sheet film exposure apparatus body with the slide lid 124 opened and film feeding rollers 157, 158, push-in guide plate 160 and film support plate 159 have entered from the body side and the both sides of the leading end of a new photographed sheet film F in the direction of movement thereof are contained along the containing space U defined by the film holding vanes 139'. The leading end of the contained photographed sheet film F is stopped while being nipped between the one-way rotatable roller 150 shown in FIG. 25 and the film receiving plate 154. F' designates a photographed sheet film contained earlier than F.

FIGS. 30 and 33 are a sideward cross-sectional view and a transverse cross-sectional view, respectively, showing a condition in which when the receive magazine driving shaft 129 has been rotated for ¼ of one full revolution in a clockwise direction (arrow) by the driving pin 161 on the exposure apparatus body side shown in FIG. 26, the film holding vanes 139' have been rotated for ⅛ of one full revolution in a counter-clockwise direction (arrow T).

Prior to the photographed sheet film F falling downwardly in FIG. 33 from a part U of the containing space defined by the film holding vanes 139' shown in FIG. 32 with the rotation of the film holding vanes 139', the film support plate 159 shown in FIG. 29 retracts rightwardly as viewed in the figure, whereafter the push-in guide plate 160 lowers to depress the photographed sheet film F downwardly along the movement path thereof.

FIGS. 31 and 34 are a sideward cross-section view and a transverse cross-section view, respectively, showing a condition in which the receive magazine driving shaft 129 has been further rotated clockwisely for ¼ of one full revolution from the condition of FIG. 30 and the photographed sheet film F has been fallen onto the lower end of the film holding vane 139'. At this time, in FIG. 30, the film support plate 159 has been retracted rightwardly, while in FIG. 31 it comes in leftwardly to hold down the trailing ends of the photographed sheet film F and the already contained photographed sheet film F'.

In this condition, the rotation of the receive magazine driving shaft 129 is stopped and only the push-in guide plate 160 is moved upwardly to its position of FIG. 29, thus making containment of a new photographed sheet film F possible.

The possibility of containment of the photographed sheet film by the use of the photographed film containing mechanism according to the present embodiment in cases where the sheet film exposure apparatus body assumes various attitudes, namely, where the receive magazine assumes the positions shown in FIGS. 35 to 39 will be described with respect to the respective cases. It is to be understood that the underside of the drawings is the floor surface side.

Figure 35:
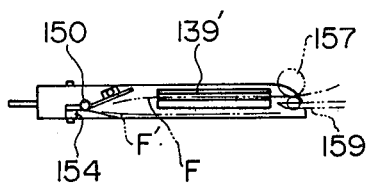
FIGS. 35-39 show the attitudes assumed by the receive magazine.

In the case of FIG. 35, the direction of gravity exerted on the already contained photographed sheet film F' in the downward direction on the drawing in which a space is created in the movement path of a sheet film F to be newly contained and therefore, the film can be contained smoothly.

Figure 36:
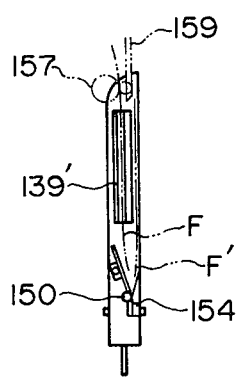
Figure 37:
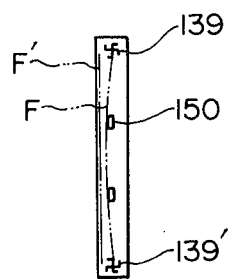

In the cases of FIGS. 36 and 37, if the already contained photographed sheet film F' falls or is curled, the movement path of the sheet film F to be newly contained will be hindered. However, since the film holding vanes 139, 139', the film support plate 159 and the one-way rotatable roller 150 suppress the falling or curling of the film, there occurs no unsatisfactory containment.

Figure 38:
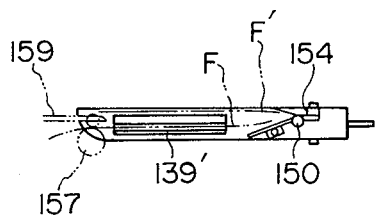

In the case of FIG. 38, the already contained photographed sheet film F' falls downwardly in the drawing and therefore hinders the movement path of the sheet film F to be newly contained. However, the four outer peripheral sides of the already contained sheet film F' are supported by the actions of the film holding vanes 139, 139', the film support plate 159 and the one-way rotatable roller 150, whereby a space for the movement path of the sheet film F to be newly contained is secured to thereby enable the film to be contained smoothly.

Figure 39:
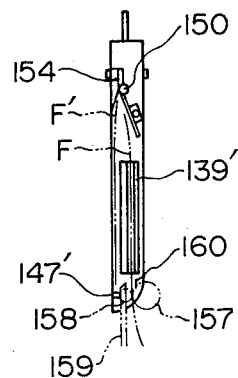

In the case of FIG. 39, in addition to the problems peculiar to the cases of FIGS. 36 and 37, there is a problem that the once contained sheet film falls onto the film feeding rollers 157, 158 side to close the film receiving port.

According to the present embodiment, however, the one-way rotatable roller 150 having a great friction force acts on the newly contained film F to prevent its backward movement. Also, where the trailing end of the contained sheet film F is left in the vicinity of the film feeding rollers 157, 158, the push-in guide plate 160 shifts the trailing end of the sheet film F from the exposure apparatus body side to the left of the roller 158 as viewed in FIG. 39 and securely supports this film F as well as the already contained sheet film F' by the film support plate 159 and the film stoppers 147, 147', and thus does not interfere with the film receiving port. Accordingly, again in the case of FIG. 39, the film can be contained smoothly.

As has hitherto been described, the use of the photographed film containing mechanism according to the present embodiment for use with a sheet film exposure apparatus enables photographed sheet films to be smoothly contained in whatever attitude the receive magazine may be placed. Accordingly, the sheet film exposure apparatus becomes capable of photographing an examinee from any angle and this will greatly benefit the diagnosis of physicians.

Also, the photographed film containing mechanism according to the present embodiment adopts a smooth rotating mechanism to shift photographed sheet films from the containing space to the containing portion and this is effective in respect of noise and vibration.

Further, in the present embodiment wherein the film support plate is put in and out from the exposure apparatus body side to hold the rear end of the four outer peripheral sides of the photographed sheet film contained in the receive magazine and the push-in guide plate is lowered from the body side when the photographed sheet film is forcibly shifted from the containing space to the containing portion, the mechanism in the receive magazine can be simplified and therefore, light weight and compactness of the receive magazine can be achieved and transportation and mounting-dismounting of the receive magazine with respect to the exposure apparatus body becomes easier.

What we claim is:

1. A magazine comprising:
   means for holding the forward end of a sheet;
   first means for dividing said magazine into a containing space and a containing chamber and for supporting each side of the sheet; and
   second means for keeping the rearward end of the sheet contained in the containing chamber, said second means being movable into and out of the path of movement of the sheet from the containing space to the containing chamber.

2. A magazine according to claim 1, wherein said first means includes a pluraltiy of vanes each having an L-shaped cross-section.

3. A magazine comprising:
means for defining a containing space for temporarily containing therein a sheet film exposed to radiation;
means for defining a containing chamber for containing the sheet film;
holding means for holding the forward end of the sheet film;
means for blocking the rearward end of the sheet film contained in the containing chamber against movement toward the containing space;
a plurality of sets of blocking elements for blocking the sheet film contained in the containing chamber against movement toward the containing space; and
means for causing said sets of blocking elements to function in succession.

4. The magazine according to claim 3, wherein said holding means has a pressing member for pressing the sheet film, and a balancer for keeping a balance relative to said pressing member.

5. The magazine according to claim 3, wherein said blocking means is movable toward and away from a movement path for shifting the sheet film from the containing space to the containing chamber.

6. The magazine according to claim 3, wherein said holding means includes a member in cooperation with the bottom of the containing chamber to pincer the sheet film.

7. The magazine according to claim 6, wherein said pincer member is a rotatably journalled roller.

8. The magazine according to claim 7, wherein said roller is rotatable only in one direction.

9. An X-ray inspection apparatus comprising:
an exposure apparatus including an exposure stage for exposing a sheet film to X-rays and means for conveying the sheet film;
a container for containing the exposed sheet film therein and removably mounted to said exposure apparatus;
a shaft rotatably supported in said container;
a plurality of blocking elements coupled to said shaft for blocking the side edges of the sheet film contained in the containing chamber against movement toward the containing space, each of said plurality of elements having an L-shaped cross-section; and
drive means for rotatively driving said shaft.

10. The apparatus according to claim 9, wherein the length of said support elements is greater than one-half of the length of the sheet film.

11. The apparatus according to claim 9, wherein said plurality of blocking elements includes at least four elements fixed to a shaft.

12. The apparatus according to claim 9, wherein said container has means for holding the forward end of the sheet film.

13. The apparatus according to claim 9, further comprising means for blocking the rearward end of the sheet film contained in the containing chamber against movement toward the containing space.

14. An X-ray inspection apparatus comprising:
an exposure apparatus including an exposure state for exposing a sheet film to X-rays and means for conveying the sheet film;
a container for containing the exposed sheet film therein and being removably mounted to said exposure apparatus;
means in said container for holding the forward end of the sheet film;
first means for dividing said container into a containing space and a containing chamber, and for blocking each side edge of the sheet film contained in the containing chamber against movement toward the containing space; and
second means for blocking the rearward end of the sheet film contained in the chamber against movement toward the containing space, said second means being movable toward and away from a movement path for shifting the sheet film from the containing space to the containing chamber.

15. The apparatus according to claim 14, wherein said holding means includes a member cooperable with the bottom of said containing chamber to pincer the sheet film.

16. The apparatus according to claim 15, wherein said pincer member is a rotatably journalled roller.

17. The apparatus according to claim 16, wherein said roller is rotatable only in one direction.

18. The apparatus according to claim 14, wherein said holding means has a pressing member for pressing the sheet film, and a balancer for keeping a balance relative to said pressing member.

19. The apparatus according to claim 14, wherein said first means has a first element for blocking each side edge of the sheet film contained in the containing chamber against movement toward the containing space, and a second element spaced apart from said first element.

20. The apparatus according to claim 19, wherein said first and second elements are connected together by a connecting member and pivotable about their respective axes.

21. The apparatus according to claim 14, wherein said first means has two shafts and a plurality of elements mounted on said shafts for blocking the side edges of the sheet film contained in containing chamber against movement toward the containing space.

22. The apparatus according to claim 21, wherein said shafts are intermittently rotatable.

23. The apparatus according to claim 14, wherein said second means is coupled to said exposure apparatus.

* * * * *